United States Patent [19]

Kashio

[11] 4,032,900

[45] June 28, 1977

[54] APPARATUS FOR DISTINGUISHING HEADING INFORMATION FROM OTHER INFORMATION IN AN INFORMATION PROCESSING SYSTEM

[75] Inventor: Toshio Kashio, Tokyo, Japan

[73] Assignee: Casio Computer Co., Ltd., Tokyo, Japan

[22] Filed: Nov. 6, 1975

[21] Appl. No.: 629,563

[30] Foreign Application Priority Data

Nov. 15, 1974 Japan .......................... 49-131645

[52] U.S. Cl. ............................................ 364/200

[51] Int. Cl.² ...................... G06F 3/00; G06F 7/10

[58] Field of Search .................... 340/172.5; 445/1

[56] References Cited

UNITED STATES PATENTS 3,286,235 11/1966 Sinn .............................. 340/172.5

*Primary Examiner*—Melvin B. Chapnick
*Attorney, Agent, or Firm*—Flynn & Frishauf

[57] ABSTRACT

An information readout apparatus comprises an information memory for successively storing heading information which includes a plurality of heading items and body information associated with said heading information, and wherein the body information is formed of one or more detail information groups, each of which includes a plurality of item numerals. The heading information and body information are distinguished from each other by different positioning codes preceding two forms of information respectively which are detected by a code detector; the heading information read out from the information memory is stored in a buffer memory in response to an output positioning code signal detected by the code detector which represents the heading information; and the heading information is read out from the buffer memory, each time a positioning code associated with the respective detail information groups is read out from the information memory and detected by the code detector. Thereafter, each detail information group is read out in the form preceded by the corresponding positioning code, said heading information, and detail information group preceded by the corresponding positioning code collectively constituting a unit record information group, and a series of unit record information groups consisting of the common heading information combined with the respective associated detail information groups are read out as a comprehensive piece of information to be later arithmetically processed.

3 Claims, 6 Drawing Figures

FIG. 1

| | | | | |
|---|---|---|---|---|
| $H_1$ | BILL FORM CODE | DATE | BUYER CODE | SALES CLERK CODE |
| $H_2$ | BILL NUMBER | PURCHASE CLERK CODE | BUYER'S DISTRICT CODE | |
| D | ARTICLE CODE | QUANTITY | UNIT PRICE | TOTAL |

FIG. 2(A)

| | | | | |
|---|---|---|---|---|
| $H_1$ | 01 | 9.10 | 1111 | 10111 |
| $H_2$ | 1235 | 2111 | 05 | |
| $D_1$ | 1511 | 10 | 15000 | 150000 |
| $D_2$ | 1530 | 5 | 1000 | 5000 |
| $D_3$ | 1750 | 20 | 10000 | 200000 |

FIG. 2(B)

| | | | | |
|---|---|---|---|---|
| $H_2$ | 1236 | 2055 | 05 | |
| $D_1$ | 1100 | 5 | 11000 | 55000 |
| $D_2$ | 1101 | 7 | 1000 | 7000 |
| $D_3$ | 1150 | 10 | 2000 | 20000 |
| $D_4$ | 1170 | 5 | 1500 | 7500 |

FIG. 2(C)

| | | | | |
|---|---|---|---|---|
| $H_1$ | 02 | 9.10 | 0011 | 05001 |
| $H_2$ | 500 | 1050 | 01 | |
| $D_1$ | 0015 | 200 | 100 | 20000 |
| $D_2$ | 0050 | 500 | 1000 | 500000 |
| $D_3$ | 0056 | 20 | 20000 | 400000 |

FIG. 2(D)

| | | | | |
|---|---|---|---|---|
| $H_1$ | 20 | 1020 | 01 | |
| $D_1$ | 0111 | 50 | 1000 | 50000 |
| $D_2$ | 0150 | 70 | 5000 | 350000 |
| $D_3$ | 0151 | 20 | 1000 | 20000 |
| $D_4$ | 0155 | 25 | 20000 | 500000 |

APPARATUS FOR DISTINGUISHING HEADING INFORMATION FROM OTHER INFORMATION IN AN INFORMATION PROCESSING SYSTEM

This invention relates to an information readout apparatus comprising a memory device which stores a plurality of detail information groups preceded by the items collectively represented by a specified heading designation, that is, just as recorded in the bill form, and from which each detail information group is read out always in the form preceded by the common items collectively represented by the aforesaid specified heading designations.

BACKGROUND OF THE INVENTION

Where information associated with various bills derived from business activities are processed by an electronic computer, bill items showing, for example, bill forms such as a debit note or delivery notice, date, buyer code, responsible sales clerk code, bill number, code of a responsible purchase clerk, and code of a buyer's district are regarded as constituent items of a piece of information represented by one heading designation. The quantities, unit prices and total sales amounts of the respective articles are added as detail information groups for each article term to the common bill items of the heading information.

Where the above-mentioned information is processed by, for example, the prior art electronic computer, each detail information group has to be processed, making it necessary to store all detail information groups in a memory in the form combined with the nondeleted common heading information.

Where, therefore, bill form information is processed, it has hitherto been necessary for an operator to supply an information memory with heading information combined with the associated detail information groups, while looking at different bills received or to provide the information memory with a conversion device of complicated mechanism.

Further, with the conventional electronic computer, information supplied almost every day is not immediately processed after being thus converted, but is successively stored beforehand in, for example, a disk type memory. After a certain period, all information received in processed at once, requiring a large capacity memory.

SUMMARY OF THE INVENTION

It is accordingly the object of this invention to provide a data readout apparatus free from the abovementioned drawbacks, wherein a body information being formed of at least one detail information group is stored in a memory for its effective utilization just as recorded in a bill, that is, in the form preceded by the common heading items collectively represented by a heading designation, and each detail information group is read out from the memory always in the form preceded by said heading items to constitute a unit record information to be processed by the data processor.

To attain the above-mentioned object, this invention provides an information readout apparatus which comprises an input data memory for storing in series heading items represented by a heading designation and the succeeding at least one detail information group in the form just as recorded in a bill used; a code detector for detecting the positioning codes of the heading information and detail information group read out from the input data memory; a buffer memory for storing the heading information read out from the input data memory upon receipt of the positioning code of said heading information from said code detector; and a control circuit for reading out the heading information, which read out from the buffer memory upon receipt of the positioning code of said detail information group, and attaching the body information read out from the input data memory to the common heading information to form a unit record information consisting of each detail information group preceded by the heading information and reading out for processing by a data processor a plurality of series arranged unit record information respectively consisting of each detail information group preceded by the common heading information. This invention has the advantages that input data can be stored in a memory device just as recorded in a bill used; each detail information group is read out always in the form preceded by the common heading information collectively represented by a heading designation so as to constitute a unit record information; and a plurality of series arranged unit record information respectively preceded by the common heading information are processed by the data processor, thereby decreasing the required capacity of the memory and simplifying input operation.

BRIEF DESCRIPTION OF THE DRAWINGS

This invention can be more fully understood from the following detailed description when taken in conjunction with the accompanying drawings, in which:

FIG. 1 illustrates a bill form;

FIGS. 2(A) to 2(D) indicate patterns in which concrete codes and numerical values are given in the respective columns of the bill of FIG. 1.

DETAILED DESCRIPTION

Figure 3:
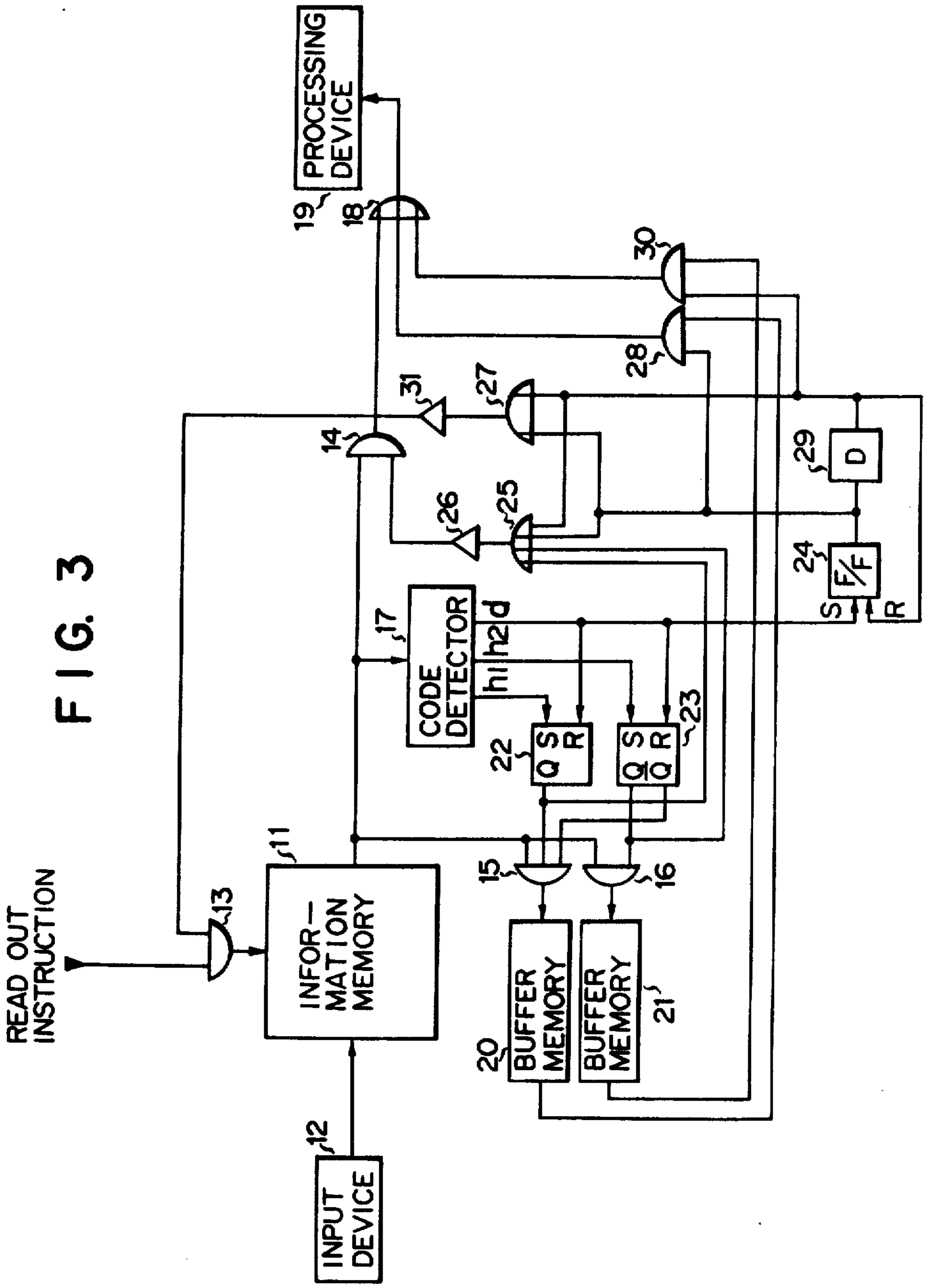
FIG. 3 is a circuit diagram of a data readout apparatus embodying this invention.

There will now be described by reference to the appended drawings a data readout apparatus embodying this invention. An input device 12, for example, comprises keys, tapes or cards, and supplies an information memory 11 with a pluraliy of detail information groups collectively denoted by different designations D1, D2, D3 and preceded by the common bill column or heading information represented by the heading information H1, H2. In this case, the first and second heading information H1, H2 are successively stored in the information memory 11 in the form preceded by the corresponding specified positioning codes which represent the heading information, and thereafter the detail information denoted by different designations D1, D2, D3 are stored in the information memory similarly in succession in the form preceded by the corresponding positioning codes which represent the detail information.

In the foregoing embodiment, overall heading information H was divided into, for example, groups H1, H2, though such division may of course be dispensed with. In fact, however, it often occurs that some of the items constituting the heading information of many different bills respectively denote the same content. If, therefore, those of the heading items of various bills which respectively indicate the same content, are collectively designated as H1 and the remaining heading items are collectively represented by other designations, for example, H2, H3 . . . . , then, the operator can supply an information memory with a reduced amount of bill heading information by deleting the heading items collectively designated as H1. Input information stored in the information memory 11 are successively read out upon receipt of a readout instruction supplied through an AND circuit 13. Both heading information and detail information thus read out are simultaneously conducted to AND circuits 14, 15, 16. A code detector 17 detects the positioning codes of the heading information H1, H2 and the specified positioning code of the detail information D1. An output signal from the AND circuit 14 is transmitted to a processing device 19 through an OR circuit 18. Outputs from the AND circuits 15, 16 are written in buffer memories 20, 21.

The signals denoting the positioning codes of the heading information H1, H2 which are detected by the code detector 17 or heading information instruction signal h1, h2 are supplied as a reset instruction to flip-flop circuits 22, 23 respectively, and also as a set instruction to a flip-flop circuit 24. A set output signal from the flip-flop circuit 22 is supplied as a gate signal to the AND circuit 15 together with a reset output signal from the flip-flop circuit 23, a set output signal from which is supplied as a gate signal to the AND circuit 16. Set output signals from the flip-flop circuits 22, 23 are supplied to an OR circuit 25. An inverter 26 connected to the output side of the OR circuit 25 sends forth a gate signal to the AND circuit 14.

When set, the flip-flop circuit 24 issues a signal to the OR circuits 25, 27 and AND circuit 28, and also to a delay circuit 29. This delay circuit 29 provides a delay time required for information to be read out from the buffer memory 20 and continues to produce an output during a period in which information is read out from another buffer memory 21. An output signal from said delay circuit 29 is conducted as a reset instruction to the flip-flop circuit 24 and also to the OR circuits 25, 27 and AND circuit 30. Information read out from the buffer memories 20, 21 is delivered to the AND circuits 28, 30, output signals from which are supplied to the OR circuit 18. An output signal from the inverter 31 connected to the OR circuit 27 controls the gate of the AND circuit 13.

Under the above-mentioned arrangement, the key input device 12 supplies the information memory 11 with data recorded in a bill used, as illustrated in FIG. 2(A). In the initial stage, the flip-flop circuits 22, 23, 24 are in a set state, supplying no output signal to the OR circuits 25, 27. As the result, the inverters 26, 31 generate an output signal having a logical level of "1".

When a readout instruction is issued under the abovementioned condition, an output signal from the inverter 31 opens the gate of the AND circuit 13. Information stored in the information memory 11 is successively read out.

The readout instruction causes a heading information instruction signal h1 preceding the heading information H1 to be read out first from among the information shown in FIG. 2(A) which are stored in the information memory 11. The positioning code is detected by the code detector 17, and then the heading information instruction signal h1 causes the flip-flop circuit 22 to be set.

A set output signal from said flip-flop circuit 22 is sent forth to the inverter 26 through the OR circuit 25, causing the AND circuit 14 to have its gate closed and the AND circuit 15 to be supplied with a gate signal. Since, at this time, the flip-flop circuit 23 is in a reset state, the gate of the AND circuit 15 is opened, causing the heading information H1 read out from the information memory 11 to be stored in the auxiliary memory 20.

After the heading information H1 is read out, the positioning code for the heading information H2 is read out. When the code detector 17 detects the positioning code, the flip-flop circuit 23 is set by the heading information instruction signal 2, causing the gate of the AND circuit 15 to be closed and the gate of the AND circuit 16 to be opened. The heading information H2 following the corresponding positioning code is stored in the buffer memory 21.

The heading information H1, H2 read out from the information memory 11 are written in the buffer memories 20, 21 respectively. When the positioning code of the detail information denoted by the designation D1 is read out from the information memory 11, and the code detector 17 detects said positioning code, then the flip-flop circuits 22, 23 are set, by the detail information instruction signal *i*, the gates of the AND circuits 15, 16 are closed and the flip-flop circuit 24 is set. A set output signal from said flip-flop circuit 24 is delivered to the OR circuits 25, 27, causing the gate of the AND circuit 28 to be opened. At this time, the AND circuit 13 connected to the OR circuit 27 through the inverter 31 has its gate closed, stopping the readout of information from the information memory 11. The heading information H1 previously stored in the buffer memory 21 through the AND circuit 28 is read out to a processing device 19 through the OR circuit 18. When an information is fully read out from the buffer memory 20, an output signal from the delay circuit 29 rises to open the gate of the AND circuit 30, causing a heading information H2 stored in the buffer memory 21 to be conducted to the processing device 19 and also the flip-flop circuit 24 to be reset to its original condition.

When the positioning code of the detail information D1 is read out, then the readout of information from the information memory 11 is stopped, and the heading information H1, H2 stored in the buffer memories 20, 21 respectively are successively read out to the processing device 19. When the heading information H2 is fully read out from the buffer memory 21, an output signal from the delay circuit 29 falls and output signals from the inverters 26, 31 rise. The gates of the AND circuits 13, 14 are opened to read out the detail information D1 from the information memory 11. Said detail information D1 is thereafter delivered to the processing device 19 through the AND circuit 14 and the OR circuit 18. Namely, the processing device 19 is supplied with a unit record information consisting of each item information preceded by heading information H1, H2.

When the detail information D1 is fully read out from the information memory 11, the succeeding detail instruction D2 begins to be read out therefrom. In this case, the positioning code of said detail information D2 is first detected by the code detector 17, causing the flip-flop circuit 24 to be set by the detail information instruction signal *i* and also the gates of the AND circuits 13, 14 to be closed, and the gate of the AND circuit 28 to be opened. At this time, the gate of the AND circuit 30 is also opened by an output signal from the delay circuit 29. As mentioned above, the heading information H1, H2 read out from the buffer memories 20, 21 respectively and the detail information D2 read out from the information memory 11 are successively supplied to the processing device 19. Namely, said processing device 19 processes a unit record information consisting of the detail information D2 preceded by the common heading information H1, H2.

Though heading information represented by, for example, heading designations H1, H2 and the succeeding plural detail information denoted by, for example, designations D1, D2, D3 are stored in seies in the information memory 11, each item of the detail information is always read out to the processing device 19 in the form preceded by the common heading information H1, H2 read out from the buffer memories 20, 21 respectively.

Where the information memory 11 is further stored with information illustrated in FIG. 2(B) in addition to the information of FIG. 2(A), then the positioning code of the heading information H2 of FIG. 2(B) is first read out after the last detail information denoted by, for example, D3 of the preceding information of FIG. 2(A), and said positioning code is detected by the code detector 17 and then produces a head information instruction signal. In the case of FIG. 2(B), the heading information H1 has the same content as that of FIG. 2(A) and consequently is not stored anew in the information memory 11. Only the heading information H2 of FIG. 2(B) which has a different content from the heading information H2 of FIG. 2(A) is stored in the information memory 11. When the above-mentioned positioning code is detected by the code detector 17, then the flip-flop circuit 23 is set to open the gate of the AND circuit 16, and the OR circuit 25 is supplied with a signal, causing the gate of the AND circuit 14 to be closed. The heading information H2 of FIG. 2(B) read out from the information memory 11 replaces the heading information H2 of FIG. 2(A) previously stored in the buffer memory 21. At this point, therefore, the buffer memories 20, 21 are stored with the heading information H1 of FIG. 2(A) and the heading information H2 of FIG. 2(B) respectively. Detail information denoted by, for example, designations D1, D2, D3, D4 shown in FIG. 2(B) are each read out to the processing device 19 always in the form preceded by the common heading information H1 of FIG. 2(A) and the new heading information H2 of FIG. 2(B).

The processing device 19 is formed of, for example, a memory for collecting values given in the respective unit record information and carrying out required arithmetic processing, a printing device, and further a card puncher.

According to the foregoing embodiment, heading information is divided into two groups represented by, for example, the heading designations H1, H2. However, it is possible to divide said heading information into a larger number of groups. Or, said heading information may be stored in the information memory 11 in the form of a single group. It is advisable to provide a buffer memory in a number corresponding to the number of divided groups of said heading information. For example, it is possible to provide a certain number of buffer memories and supplementary units in series and selectively use some of said buffer memories according to the manner in which heading information is divided, thereby modifying the overall capacity of said buffer memories as occasion demands. Obviously, this invention can be practiced in various modifications without changing the object thereof.

What is claimed is:

1. Apparatus for controlling information transmitted to a processing device, comprising:

a. means (12) for inputting information, said information comprising in series arrangement a heading information positioning code, a heading information inserted immediately after said heading information positioning code, a body information, and a body information positioning code inserted immediately after said body information, said body information being formed of one or more detail information group each of which includes a plurality of item information;

b. input information memory means 11 for storing the information from said iputting means (12);

c. judgment means (17) coupled to said input information memory means (11) for distinguishing between the heading information and detail information groups, said judgment means (17) detecting that positioning code inserted before the respective information which is read out from said input information memory means;

d. buffer memory means (20,21) coupled to said iput information memory means (11) and to said judgment means (17) for storing in turn heading information read out from said input information memory means in response to the heading information positioning code detected by said judgment means;

e. means (22,23,25,26,14) coupled at least to said information memory means (11) and to said buffer memory means (20,21) for prohibiting the heading information from being transmitted to a processing device while said heading information is being read out from said input information memory means;

f. means (24,29,28,30) coupled to said judgment means (17) for temporarily inhibiting the detail information from being transmitted when said detail information positioning code is detected by said judgment means and for enabling the reading out of the heading information from said buffer memory means for transmission to said processing device; and g. means (24,29,27,31,25,26,14) coupled to said judgment means (17) for reading out the detail information from said input information memory means when the handling information is read out from said buffer memory means, to form at least one unit record information comprised of a detail information group preceded by the heading information.

2. Apparatus according to claim 1 wherein said judgment means (17) includes means for distinguishing between the heading information and detail information groups by detecting the different specified positioning codes which represent respectively the preceding heading information and the detail information groups.

3. Apparatus according to claim 1 wherein said heading information comprises a plurality of groups, each of said groups including a plurality of items.

* * * * *

UNITED STATES PATENT AND TRADEMARK OFFICE

CERTIFICATE OF CORRECTION

PATENT NO. : 4,032,900

DATED : June 28, 1977

INVENTOR(S) : Toshio KASHIO

It is certified that error appears in the above-identified patent and that said Letters Patent are hereby corrected as shown below:

Column 6, line 15, after "mation" change "group" to --groups--;

line 50, after "when the" change "handling" to --heading--.

Signed and Sealed this

*Twentieth* Day of *December 1977*

[SEAL]

*Attest:*

RUTH C. MASON
*Attesting Officer*

LUTRELLE F. PARKER
*Acting Commissioner of Patents and Trademarks*

UNITED STATES PATENT AND TRADEMARK OFFICE

CERTIFICATE OF CORRECTION

PATENT NO. : 4,032,900

DATED : June 28, 1977

INVENTOR(S) : Toshio KASHIO

It is certified that error appears in the above—identified patent and that said Letters Patent is hereby corrected as shown below:

Column 6, line 13 (Claim 1), "after" should read -- before-.

Column 6, line 18, change "iputting" to --inputting--;

Column 6, line 26, change "iput" to --input--.

Signed and Sealed this

*Twenty-first* Day of *December 1982*

[SEAL]

*Attest:*

GERALD J. MOSSINGHOFF

*Attesting Officer* *Commissioner of Patents and Trademarks*